D. D. MOFFAT.
ORE CONCENTRATION.
APPLICATION FILED NOV. 9, 1917.

1,400,308.

Patented Dec. 13, 1921.

Inventor:
David D. Moffat
by Arthur P. Knight
his Attorney

UNITED STATES PATENT OFFICE.

DAVID D. MOFFAT, OF HAYDEN, ARIZONA.

ORE CONCENTRATION.

1,400,308.  Specification of Letters Patent.  Patented Dec. 13, 1921.

Application filed November 9, 1917. Serial No. 201,043.

*To all whom it may concern:*

Be it known that I, DAVID D. MOFFAT, a citizen of the United States, residing at Hayden, in the county of Gila, and State of Arizona, have invented a new and useful Improvement in Ore Concentration, of which the following is a specification.

This invention relates to concentration of ores of copper or other metals by flotation, and particularly, to a process wherein the pulp of comminuted ore and water is aerated by the action of air or other gas, forced into the pulp, together with a flotation agent such as oil, tar, etc., which enables the mineral value of the ore to be selectively floated by the rising bubbles produced in such aeration. In order to bring the flotation agent into most effective and uniform contact with the ore pulp, it is advantageous to apply said agent in the form of vapor carried by the air or other gas passed into the pulp for aeration thereof, and the main object of my invention is to provide for applying in this manner, flotation agents, such as certain oils, tar, etc., which are not readily volatile at ordinary temperatures.

According to my invention, a flotation agent such as oil, tar, creosote, etc., is applied in the form of vapor, mixed with air, by spraying or atomizing such agent into heated air and conducting the resulting mixture of air and vapor, while still hot, into the pulp to be treated.

The accompanying drawing illustrates apparatus suitable for carrying out my invention and referring thereto:

Figure 1:
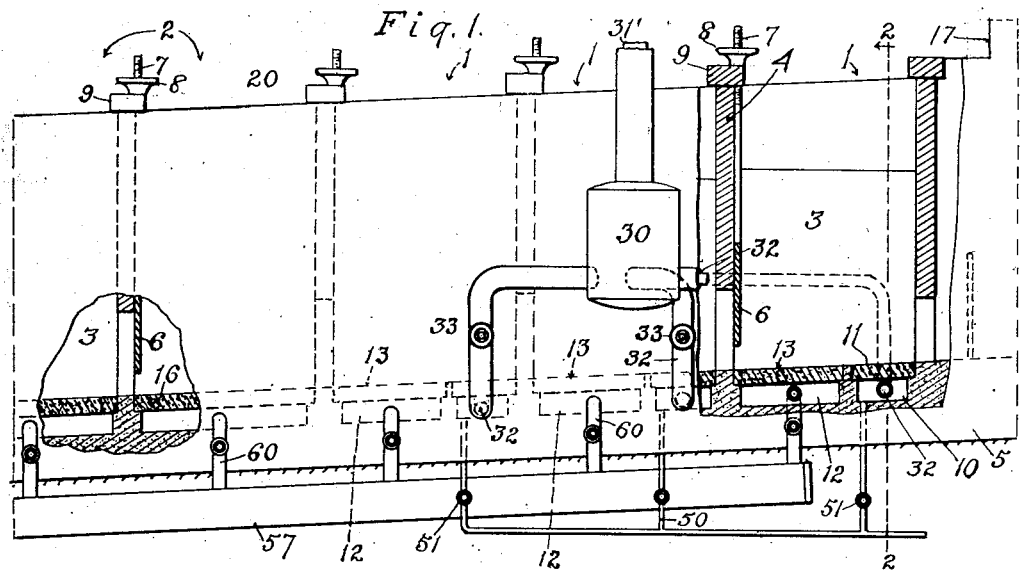
Figure 1 is a side elevation of such apparatus, partly in section.
Figure 2:
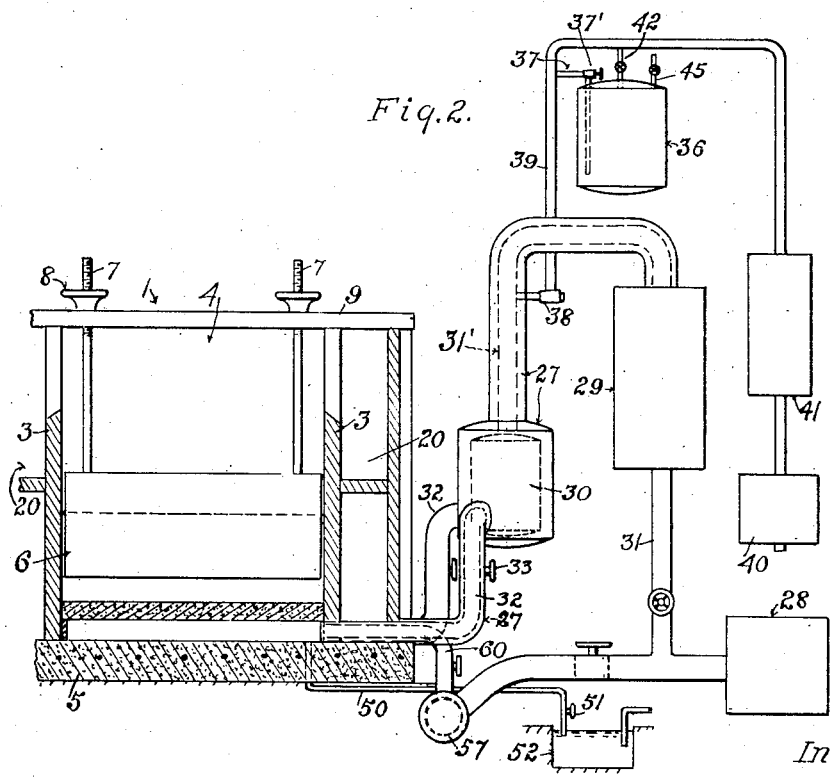
Fig. 2 is a section on line 2—2 in Fig. 1.

In carrying out my invention, I prefer to use flotation cells of the form shown at 1 and 2, comprising side walls 3, vertical partition walls 4, and a floor 5, said floor being inclined to facilitate flow of pulp thereover and the partition walls 4 being spaced from said floor to permit flow of the pulp from cell to cell. Suitable baffles 6 are provided for regulating such flow, said baffles being, for example, mounted for vertical adjustment, by screw rods 7, engaging in hand wheels 8, which rest on top bars 9. Of the two forms of cells shown in Fig. 1, the first or uppermost cells 1 are adapted for supply of the flotation agent along with air, the floor of each of said cells being provided with a passage or chamber 10, connected to suitable means for supplying a mixture of air and of flotation agent in the form of vapor, the top of said chamber being formed of a porous mat or plate 11, over which the pulp flows. Said cell 1 may also be provided with a chamber or chambers 12 in its floor, covered by a porous mat or plate 13 and communicating with a source of compressed air. The mat or section of the floor through which the mixture of flotation agent and air is admitted is preferably located at the upper end of the cell. Any desired number of cells, such as shown at 1, may be arranged in series so that the pulp will flow through all of them successively, and in addition there are preferably provided cells of the form shown at 2 in Fig. 1, said cells 2 being of similar construction to cell 1, except that the air supply passages 15 in the bottom thereof, are connected only to compressed air supply means for furnishing air for aeration of the pulp through porous mats or plates 16, between said passages and said cells. I have found it advantageous to make the floor sections or porous mats or plates 11, 13 and 16 of molded material, such as porous cement composition, consisting for example, of rock screenings bonded with Portland cement, the screenings for sections 11 being, for example, of about 6 to 8-mesh size, and the screenings for sections 13 and 16 being, for example, of about 20-mesh size, so that the sections 13 and 16 are of closer or finer grained structure than the sections 11.

The flotation cells constructed as above described, may be arranged in series in any suitable manner, to receive the pulp successively in the series of cells.

The ore pulp supply means 17 comprises a chute delivering the pulp at the bottom part of the first cell of series 1. From the lower ends of the series of cells 2, the tailings are discharged in the usual manner. The concentrates from cells 1 and 2 flow over the side walls 3 to concentrates launders 20.

The compressed air supply means may comprise an air pump 28 adapted to compress air to a pressure of about 1 to 6 pounds, (preferably about 2 pounds) per square inch, and a pipe 31 connected to receive the compressed air from said pump and leading to a heater 29 from which a pipe 31' leads to a chamber or receiver 30 having outlet pipes 32 leading to the passages 10 of the several cells 1, valves 33 being provided in pipes 32 for controlling the flow of air to each of said cells. Pipe 31' and 32 and receiver 30 may be provided with heat insulating lagging 27. Suitable means are provided for supplying flotation agent, such as a flotation oil, to the air passing to chamber 30. For this purpose, a tank 36 containing such agent in liquid form, supplied thereto, for example, through pipe 45, is connected by piping 37, including a needle valve 37', to a high pressure compressed air pipe 39 leading to an atomizer 38 which sprays or atomizes the liquid flotation agent into pipe 31'. The high pressure air, which may be at any pressure suitable for the atomizing operation, may be supplied to pipe 39 by a pump 40, and may be heated in a heater 41. This high pressure air may also be conducted from pipe 39 by pipes 42 to the top of oil tank 36.

A drain connection 50, provided with a valve 51, leads from each chamber 10 to a sump 52, so as to enable any liquid such as condensed oil, collecting in chamber 10, to be drawn off therefrom, said liquid being pumped back to tank 44, if desired, by suitable pumping means.

An air main 57 is connected to air pump 28 and valved pipes 60 lead from said main to respective air supply passages 12 and 15 of the cells 1 and 2.

Other apparatus than that above described may be used for carrying out my invention, provided it is adapted to apply the mixture of air and vapor of oil or other flotation agent to the pulp with the required degree of uniformity, and to provide the necessary aeration of the pulp to complete the flotation. In particular, the porous mats or plates through which the air is forced, may be of various materials, whether natural porous rock, or artificial slabs of any kind, it being necessary, however, that these mats should be porous, and of considerable extension so as to prevent a multiplicity of closely spaced openings extending over a sufficiently large surface to provide for uniform distribution of the air in the pulp.

My process may be carried out in the above described apparatus, as follows:

The ore pulp, resulting from comminution of the ore with water, is conducted by feed means, to the upper end of the series of cells, without any preliminary agitation or treatment with oil or other flotation agent, and flows successively through all of said cells. Air, compressed by pump 28 to a pressure of say, one to six pounds (preferably about two pounds), per square inch, is heated in heater 29 and is conducted through pipe 31 wherein it is charged or impregnated with a flotation agent distributed thereinto by atomizer 38, air being supplied through pipe 39 at sufficient pressure to produce atomization. Any suitable oil or other floatation agent may be used, the heating of air tation agent may be used, the heating of air supplied through pipes 31 and 39 being sufficient to cause such agent to be vaporized and carried forward by the air (or at least to enable a sufficient portion thereof to be vaporized for the purpose of this invention). The mixture of air and vaporized flotation agent passes to chamber 30, whence it is distributed by pipes 32 to the several passages or chambers 10 in the floor or bottom of cells 1, and passing up through the pores or interstices of the porous mats or plates 11, issues therefrom in the form of jets or streams of vapor laden air. Such air, on entering the pulp, breaks up into bubbles which rise in the pulp, and by reason of the great number, close spacing and variant direction of the streams of air (due to the irregular porous structure of the mats or plates 11), the whole body of pulp above the said mats or plates 11, becomes filled or occupied with substantial uniformity, by bubbles of air carrying flotation agent. I have found that when porous cement mats constructed as above described, are used for distributing the vapor laden air, there is but little condensation of the vapor until the mixture of vapor and air comes in contact with the pulp, and any of such agent that may condense in the passages leading to the mat, may be pumped back into the atomizing apparatus. While it is the aim of this invention to apply the flotation agent, mainly in the form of vapor, there may, under certain conditions, be more or less of the flotation agent carried along in the state of fine particles of liquid suspended in the air and vapor. The flotation agent is applied to, or comes in contact with the pulp articles at the surfaces where the bubbles adjoin such particles and when so applied, it is in the form of most minute subdivision, so that no agitation is required or used, either for subdividing the oil or other flotation agent, or for distributing it in the body of pulp, the required sub-division resulting directly from the contact of the vapor laden air with the pulp, and the required distribution resulting from the uniform distribution of the bubbles in the pulp. In fact, the sub-division and distribution of the flotation agent by this method may be made more effective than is practicable by agitation of liquid oil with the pulp.

In addition to its function of supplying the flotation agent in condition of extreme sub-division and at the same time distributing such finely divided agent to all parts of the pulp, the compressed air forced into the lower part of the cells 1, as above described, serves as an aerating agent for the pulp, the bubbles produced in the pulp by the air, rising to the surface and flowing over the side walls 3 of the cells, this overflowing foam or mass of bubles carrying with it the concentrates which pass along the launders 20 to suitable receiving means, such as cleaner cells, for completing the concentration. The mixture of air and the vapor of the flotation agent retains the heat to a greater or lesser extent in passing through the apparatus and is still in a more or less heated condition when it is delivered to the ore pulp, that is, it is sufficiently heated to effect the purpose of this invention. Such cleaner cells may be of similar construction to the cells 2. The complete operation of the air supplied in this manner and laden with vapor of flotation agent so as to distribute oil or other flotation agent to the pulp, as well as to aerate the same, may be termed an oiling aeration, as it performs both of these functions simultaneously, the word "oiling", in this case, including the use of any equivalent flotation agent capable of being supplied by the air in this manner. In practice, I find it desirable to introduce a further amount of air for aeration purposes only, in addition to that supplied for oiling aeration as above described. In the apparatus shown in the drawings, this additional aerating air is introduced partly in the same cells 1 that are used for the oiling aeration, and partly in succeeding cells 2, which are used for aeration only. Air under a pressure of say, 1 to 6 pounds, (preferably about 2 pounds) per square inch, passes from main 57 through valved pipes 60 to the several passages 12 below the respective porous plates 13 of cells 1, and to passages 15 below the respective porous plates 16 of cells 2, so that minute bubbles of air are disseminated throughout the pulp in all the cells, and in rising through the pulp, carry up with them the mineral concentrates thereof, so as to complete the flotation of the concentrates from the pulp. I have shown the first three cells 1 in each row as provided with means for oiling-aeration, and the remaining cells 2 of each row as provided with means for aeration without further supply of oil, etc., but the means for oiling-areation may be provided in any desired number of the series of cells.

What I claim is:

1. The process of concentrating ores, which consists in distributing flotation agent into air heated sufficiently to cause vaporization of such agent, and materially heat the resulting mixture and forcing the resulting mixture of heated air and vapor of flotation agent into a pulp of comminuted ore and water so as to form a column of mineral bearing bubbles which rise to the surface and may be floated off.

2. The process of concentrating ores, which consists in compressing and heating air, atomizing liquid flotation agent into the compressed and heated air by the action of an elastic fluid at higher pressure than said compressed air, thereby producing a mixture of the heated air and vapor of flotation agent and forcing such mixture in heated condition through a porous body into a pulp of comminuted ore and water forming a column of mineral bearing bubbles which rise to the surface and may be floated off.

3. An apparatus for concentrating ores comprising means for supplying compressed air, means for heating said compressed air, means for distributing a flotation agent into the heated compressed air so as to vaporize the same and form a mixture of heated air and vapor of the flotation agent, means for receiving the ore pulp, connecting means for receiving said heated mixture of air and vapor, and a porous body between said connecting means and said ore receiving means for distributing said heated mixture of air and vapor uniformly into the pulp.

4. An apparatus for concentrating ores, comprising means for supplying heated compressed air, means for supplying heated elastic fluid at higher pressure than such compressed air, an atomizer provided with means for supplying liquid flotation agent and connected to said means for supplying elastic fluid at high pressure and adapted to atomize said liquid flotation agent into the heated compressed air to form a mixture of heated air and vapor of flotation agent, means for receiving the ore pulp and means for distributing the mixture of heated compressed air and vapor of flotation agent uniformly into said ore pulp.

5. The process of concentrating ores, which consists in first subjecting a pulp of comminuted ore and water, to oiling aeration by distributing therein, heated air containing oil vapor, and then to further aeration by distributing air alone therein.

6. The process of concentrating ores, which consists in forcing into a flowing pulp of comminuted ore and water, heated air carrying a flotation agent, so as to distribute flotation agent in the pulp, and forcing into the pulp in which flotation agent has thus been distributed, a further quantity of air alone for completing flotation of mineral in the ore.

7 An apparatus for ore flotation, comprising a cell provided with means for passing ore pulp therethrough, a plurality of passages adjacent to the lower part of said cell, porous plates between said passages and the cell, means for supplying heated compressed air mixed with vapor of flotation agent to one of said passages, and means for supplying compressed air to the other of said passages 8. An apparatus for air flotation, comprising a series of cells connected to successively receive ore pulp, means for applying and distributing heated gas carrying flotation agent to the first part of said series of cells, so as to apply the flotation agent to all parts of the pulp, by contact with said gas, and means for applying and distributing gas to a succeeding part of said series of cells, for aeration and flotation of the ore pulp therein.

In testimony whereof I have hereunto subscribed my name this 27 day of October 1917.

DAVID D. MOFFAT.